United States Patent
Paz-Tal

(10) Patent No.: US 10,222,220 B2
(45) Date of Patent: Mar. 5, 2019

(54) TRAVEL PLANNER PLATFORM FOR PROVIDING QUALITY TOURISM INFORMATION

(71) Applicant: Gershon Paz-Tal, Rosh Haayin (IL)

(72) Inventor: Gershon Paz-Tal, Rosh Haayin (IL)

( * ) Notice: Subject to any disclaimer, the term of this patent is extended or adjusted under 35 U.S.C. 154(b) by 0 days.

(21) Appl. No.: 15/304,113

(22) PCT Filed: Apr. 19, 2015

(86) PCT No.: PCT/IL2015/050414
§ 371 (c)(1),
(2) Date: Oct. 14, 2016

(87) PCT Pub. No.: WO2015/162606
PCT Pub. Date: Oct. 29, 2015

(65) Prior Publication Data
US 2017/0045365 A1    Feb. 16, 2017

(30) Foreign Application Priority Data
Apr. 24, 2014  (IL) .......................................... 232254

(51) Int. Cl.
*G01C 21/34* (2006.01)
*G06Q 50/14* (2012.01)
(Continued)

(52) U.S. Cl.
CPC ....... *G01C 21/343* (2013.01); *G01C 21/3679* (2013.01); *G06F 17/30864* (2013.01);
(Continued)

(58) Field of Classification Search
CPC .. G01C 21/343; G06F 17/30864; G06Q 10/02
See application file for complete search history.

(56) References Cited

U.S. PATENT DOCUMENTS 5,948,040 A  *  9/1999  Delorme ................ G01C 21/36
                                               340/990
6,119,095 A       9/2000  Morita
                          (Continued)

OTHER PUBLICATIONS

Paz-Tal et al.; "The "Tourphonet" System: An Innovative Solution for Personal-Assisted Tele-Communication Info-Tourist and Commercial Service", Technology Impact on Cultural Tourism Conference Proceedings, Jun. 7-29, 2000, Istanbul, Turkey, 11 pages.
(Continued)

*Primary Examiner* — Alex C Dunn
(74) *Attorney, Agent, or Firm* — Ohlandt, Greeley, Ruggiero & Perle, L.L.P.

(57) ABSTRACT

The present invention relates to a system for providing Quality Tourism Information (QTI) for a Free Individual Traveler (FIT) to obtain localized information specific to a particular geographic area (e.g., few meters) and compile an itinerary, in real time comprising: a) a web-enabled server (cloud) adapted to communicate with a plurality of sources and databases comprising information on a plurality of tourist attractions, lodging establishments, and services; b) a User Interface (UI) to facilitate interaction with said server and provide solutions to said traveler, said UI comprising, a menu containing introductory solution for a specific geographic area and a function for allowing to specify desired tourist attractions and resources to be submitted via said function to a Tourism Individual Planning (TIP) algorithm; and c) a TIP algorithm for retrieving information from said sources and databases and for generating at least one personal itinerary form said retrieved solutions based on "Tourism Logic".

8 Claims, 2 Drawing Sheets

(51) Int. Cl.
  *G08G 1/0967* (2006.01)
  *G08G 1/0968* (2006.01)
  *G08G 1/0969* (2006.01)
  *G01C 21/36* (2006.01)
  *G06F 17/30* (2006.01)
  *G06F 3/0482* (2013.01)

(52) U.S. Cl.
  CPC ........... *G06Q 50/14* (2013.01); *G08G 1/0969* (2013.01); *G08G 1/09685* (2013.01); *G08G 1/096716* (2013.01); *G08G 1/096741* (2013.01); *G08G 1/096775* (2013.01); *G08G 1/096816* (2013.01); *G08G 1/096838* (2013.01); *G08G 1/096883* (2013.01); *G08G 1/096894* (2013.01); *G06F 3/0482* (2013.01)

(56) References Cited

U.S. PATENT DOCUMENTS

| | | | | |
|---|---|---|---|---|
| 6,321,158 | B1* | 11/2001 | DeLorme | G01C 21/26 340/995.16 |
| 7,162,436 | B1* | 1/2007 | Eckel, Jr. | G06Q 20/102 705/14.67 |
| 9,009,167 | B2* | 4/2015 | Cerny | G06Q 10/02 705/6 |
| 9,195,765 | B2* | 11/2015 | Russell | G06F 17/3087 |
| 2004/0117275 | A1* | 6/2004 | Billera | G06Q 10/02 705/28 |
| 2005/0234750 | A1* | 10/2005 | Attebury | G06Q 10/02 705/5 |
| 2007/0078729 | A1* | 4/2007 | Brown | G06Q 10/02 705/5 |
| 2007/0185744 | A1* | 8/2007 | Robertson | G06Q 10/02 705/5 |
| 2007/0239348 | A1 | 10/2007 | Cheung | |
| 2008/0046298 | A1* | 2/2008 | Ben-Yehuda | G06Q 10/025 705/6 |
| 2009/0210262 | A1* | 8/2009 | Rines | G06Q 10/02 705/5 |
| 2010/0070376 | A1* | 3/2010 | Proud | G06Q 20/20 705/21 |
| 2011/0055043 | A1* | 3/2011 | Shuchman | G06Q 10/025 705/26.5 |
| 2011/0071865 | A1* | 3/2011 | Leeds | G06Q 10/025 705/6 |
| 2011/0301835 | A1* | 12/2011 | Bongiorno | G01C 21/343 705/6 |
| 2012/0185793 | A1* | 7/2012 | Binsztok | G06Q 10/02 715/772 |
| 2012/0254763 | A1* | 10/2012 | Protopapas | G06F 17/30554 715/738 |
| 2013/0041696 | A1* | 2/2013 | Richard | G06Q 30/06 705/5 |
| 2013/0218682 | A1* | 8/2013 | Alterman | G06Q 10/00 705/14.58 |
| 2014/0108066 | A1* | 4/2014 | Lam | G06Q 10/10 705/5 |
| 2014/0108160 | A1* | 4/2014 | Gluhovsky | G06Q 50/14 705/14.71 |
| 2014/0229287 | A1* | 8/2014 | Ben-David | G06Q 10/10 705/14.58 |
| 2015/0032484 | A1* | 1/2015 | Mermelstein | G06Q 10/02 705/5 |
| 2015/0207711 | A1* | 7/2015 | Le Merrer | H04L 41/5009 709/224 |
| 2015/0294239 | A1* | 10/2015 | Araya Hernandez | G06Q 10/025 705/6 |

OTHER PUBLICATIONS

International Search Report dated Aug. 4, 2015 from corresponding International Application No. PCT/IL2015/050414, 3 pages.
Written Opinion dated Aug. 4, 2015 from corresponding International Application No. PCT/IL2015/050414, 6 pages.
Paz-Tal et al., "Technology Impact on Cultural Tourism—The Tourphonet Systems an Innovative Solution for Personal Assisted Tele-Communication Info Reservation Tourist and Commercial Service", In The Istanbul Tourism Conference, Jun. 26-27, 2000, pp. 365-372.
Cheverst, Keith, et al.; "Developing a context-aware electronic tourist guide: some issues and experiences"; In: Proceedings of the SIGCHI conference on Human Factors in Computing Systems, ACM, 2000. p. 17-24.
Israeli Office Action dated Mar. 19, 2018 from corresponding Israeli Patent Application No. 232254, 3 pages.

\* cited by examiner

TRAVEL PLANNER PLATFORM FOR PROVIDING QUALITY TOURISM INFORMATION

FIELD OF THE INVENTION

The present invention relates to the field of tourism information. More particularly, the invention relates to a method and system of providing Quality Tourism Information (QTI) in real time for a Free Individual Tourist (FIT) to get localized and nationalized solutions specific to a particular geographic area and to compile an itinerary in real time (few seconds).

BACKGROUND OF THE INVENTION

The internet is a great service to distribute content (e.g., by utilizing tools such as apps, smartphones, portals, etc.), but the nature of the content such as: the organization of the content, the "contents" of the content, the components of the content, the amount of content components, the internet architectural structure today (as of 2014) lacks the ability to combine and integrate the content with the human aspect and QTI, with various human elements and characteristics, in connection with the quality context-specific tourist information The existing tools for extracting content from the internet cannot determine or present the meanings relevant to man (his personality traits), nor give meaning to findings A+B–C and so on. Moreover, the existing internet environment cannot (as of 2014) provide all in the context of QTI to the FIT in real time.

Very often a person's vacation involves traveling to and staying in places outside their usual environment, which usually requires the person for selecting and organizing the sightseeing or tourism activities, with such activity having a tendency to be under-planned and the available time under-utilized, because many people do not themselves take advantage of the offerings of the place where they reside. Some people may travel abroad fairly regularly and with it usually being for work-related purposes, while for others, such an out-of-country journey may ordinarily constitute a long-awaited luxury vacation (either abroad or in one own country).

Either a trip or a regular travel demands appropriate preparation and organization to take advantage of the limited time available, and to optimize the large expenses that may be incurred for simply being there for that time-large expenses which may be in the form of airfares, hotels, ground transportation costs, and meals at restaurants. Also, even for the well-designed trip, there may be lost time requiring spur of the moment changes because of poor weather during the trip, an unexpected closure, or some other event that was unforeseen during the planning stages-planning which had likely occurred many months before the travel dates.

Moreover, for the organized traveler or tourist, tripper or holidaymaker, planning often consists of reading portions of at least one travel guide book or travel portal that comprises hundreds of pages, some of which may need to be marked for later reference at key points of the travel to assist in finding one's way, and to enrich the travel experience. Some marked pages may have addresses for sites and events, while other pages may have maps. So preparing the itinerary may involve making a list on a sheet of paper of the sites to be visited and the dates of such daily trips, as well as trying to cross reference the portions of the trip to pages in the travel book.

There currently is no means of efficiently supplying all of this travel-related planning and plurality of information in one place and in real-time, and of assistance to, the traveler, once arriving at the destination or before arriving.

The present invention combines all of the functionality of the literature and electronic systems which may need to be utilized in planning and richly experiencing a vacation and trip and visiting, into one elegant and practical Quality Tourism Information, in one package at once, with powerful features to enhance everyone's vacation and travelling experience. The itinerary planning may be accomplished utilizing planning tool tools, which may simulate having an experienced travel solution offering in-person advice throughout such planning.

It is an object of the invention to provide a system with that ability of generating and providing "Quality Tourism Information" in real time.

It is another object of the present invention to provide and distribute "Quality Tourism Information" via any technological platform, such as on telephone call, on line, on net, by fax, by SMS, on camera, on board, by chat, on view, by app, etc.

It is yet another object of the present invention to provide a means of planning a travel itinerary from a list of options, with the further assistance of a novel tool that does not yet exist in the tourism information field.

It is a further object of the invention to provide a means for receiving options to deviate from a planned itinerary while en route to or during a leg of the actual trip.

It is also an object of the invention to provide a means of quickly (i.e., few seconds) getting information (i.e., solutions) relating to various aspects of the destination right now, within seconds.

It is another object of the invention to provide a means of entering requests and information to interact with the itinerary planning capability via a traveler terminal device.

Other objects and advantages of the invention will become apparent as the description proceeds.

SUMMARY OF THE INVENTION

The present invention relates to a system for providing Quality Tourism Information (QTI) for a Free Individual Traveler (FIT) to obtain localized information specific to a particular geographic area (e.g., few meters) and compile an itinerary, in real time comprising:
a) a web-enabled server (cloud) adapted to communicate with a plurality of sources and databases comprising information on a plurality of tourist attractions, lodging establishments, and services;
b) a User Interface (UI) to facilitate interaction with said server and provide solutions to said traveler, said UI comprising, a menu containing introductory solution for a specific geographic area and a function for allowing to specify desired tourist attractions and resources to be submitted via said function to a Tourism Individual Planning (TIP) algorithm;
c) a TIP algorithm for retrieving information from said sources and databases and for generating at least one personal itinerary form said retrieved solutions based on "Tourism Logic".

According to an embodiment of the invention, the function including a solution form for allowing specifying a particular point in a city and a region or route.

According to an embodiment of the invention, the specific solution form allows specifying a particular type of tourist attraction that the traveler may not know about it exists or aware of its existence (i.e., "the traveler does not know that he does not know").

According to an embodiment of the invention, the specific solution form allows specifying a particular price range.

According to an embodiment of the invention, the system further comprises an upcoming events module for providing a list of upcoming local events in the specific geographic area that can be provided by a call center (herein "C6").

In another aspect, the present invention relates to a method for providing quality tourism information for a free individual traveler to obtain localized information specific to a particular geographic area and compile an itinerary, comprising:
a) maintaining a web server adapted to communicate with plurality of sources and database comprising information on a plurality of tourist attractions all within a defined geographical area;
b) providing a User Interface (UI) on said web-enabled server comprising a menu containing introductory travel information as solution on the geographic basis area to allow to specify desired tourist attractions and resources;
c) submitting data that represent said specified desired tourist attractions and resources via said solution function to a Tourism Individual Planning (TIP) Algorithm;
d) providing solutions said sources and databases and retrieving information according to the operation definition of said TIP algorithm; and
e) generating at least one, actually unlimited solutions itinerary according to said retrieved information.

DETAILED DESCRIPTION OF THE INVENTION

Figure 1:
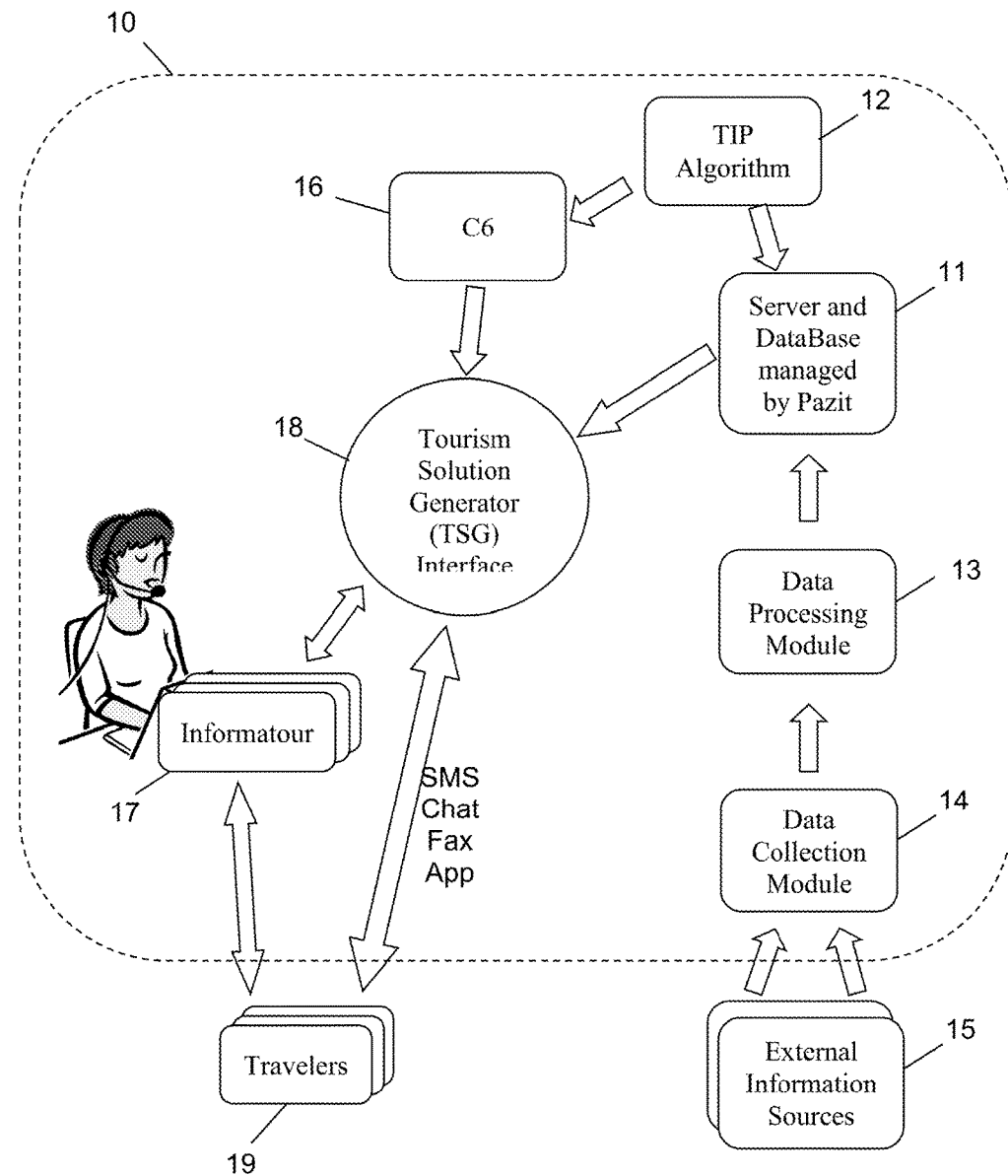
FIG. 1 is a block diagram illustrating the basic layout of a Tourism Solution Generator (TSG) system, according to an embodiment of the present invention.

Reference will now be made to several embodiments of the TSG system of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The present invention relates to a Tourism Solution Generator (TSG) system for providing Quality Tourism Information (QTI). The system provides a travel planner ongoing platform as a tourism solution along the trip and vacation for a potential traveler or tourist during his trip to receive localized information specific to a particular geographic area, get specific answers to questions that they might have, and in return receive suggestions for one or possible itineraries either automatically or by a professional human operator qualified to operate the system of the present invention (hereinafter "informatour"). The tourist may communicate with the system by any available communication method such as verbal method (e.g., spoken language, talking or voice commands), text, graphic symbol that represents an idea or concept (e.g., icon language, ideogram, emoji, and the like).

The term "anomaly" refers herein to tourism information that has lot vast amount of subjects, no common rule, type, arrangement, or form and the use of that information.

The term "Tourism Human Engineering" refers herein to a new act, method and module as a part of the system which has the ability to identify the real human situation and translate it to provide "Quality Tourism Information" based on tourism logic.

The term "Tourism Logic" refers herein to a thinking, habits, activities etc. by the tourist and at leisure but not a day by day consuming. The "Tourism Logic" refers to different way of thinking and activities by the tourist himself in "touring or leisure situations". See also Paz-Tal Gershon, Managing Tourism & Leisure Businesses, Five Mode of Tourism Experiences, 600 pages, Lahman Publishing House, Israel, 1998, pages 131, 226-227; Paz-Tal Gershon, It All Start At Home, leisure Management from Theory to Practice, Opus & Gefen Publishers, 370 Pages, Ramat-Gan, Israel, 2005; and Paz-Tal Gershon, Yoni Shapira, Raphael Raymond Bar-On, Technology Impact On Cultural Tourism—The Tourphonet Systems an Innovative Solution for Personal Assisted Tele Communication Info Reservation Tourist and Commercial Service, In The Istanbul Tourism Conference, 26-27 Jun. 2000, pp. 365-372.

The term "Quality Tourism Information" (QTI) refers herein to the tourist consumer habits and more, which define the total types of information needed by the tourist. For example, the QTI may include information such as the following (all at one interaction of the tourist with the TSG system):
1. Practical information & data—where, what is there, when, how much how to get there, timing, budgeting, language, guiding etc.
2. Suggestions—What is better to do or where better to start (A, B or C), and sometimes just a starting point is needed.
3. Recommendations and explanations—Why "A" and not "B"
4. Guidance—Because of (timing, duration, physical issues etc.) go to . . . and follow the . . . realize that . . . —Walking the tourist through the action.
5. Orientation—better be safe than sorry, give directions based on terrain, timing, and the individual.
6. Saves for Booking—Tickets to a show, hotel, car etc.
7. Alternatives—Getting them on-route as conditions change (Weather, money, feeling)
8. Planning a route—The route based on attraction, availability and tourist interests.
9. Planning a vacation—A full plan based on budget, interests, destinations, duration, special conditions, etc.
10. Opinions—many times the tourist wants an opinion from someone who has been or knows what (from his data) going on there, done that, eat there, and is not impartial and not economically bias. ( . . . or knows the real condition there from his(update) information & data).

As will be appreciated by a person skilled in the art, the above are only exemplary information, and the QTI may include more types of information.

FIG. 1—Is a block diagram illustrating the basic layout of the TSG system of the present invention, which is herein described in details. FIG. 1 shows a system that can be used in conjunction with the invention. The TSG system generally indicated by numeral 10 in the figure comprises a server 11 operated by a main operation module (called herein Pazit) that operates system 10, a Tourism Individual Planning (TIP) algorithm 12, a data processing module 13, a data collection module 14 from external information sources 15, a call center 16 (called herein C6), an informatour 17, and a TSG interface 18.

According to an embodiment of the present invention, the system can be implemented on one or more independent web-enabled server 11 that managed by Pazit, thereby allowing communications between the system and travelers 19 (i.e., clients). The web-enabled servers 11 communicate over the Internet. The server 11 may run on a web-enabled Microsoft platform, such as Windows Server 2012 R2 and MS SQL Server, though these are exemplary components only and other web-enabled platform can be used. Data extracted from external sources 15 (by the data collection module 14) populates an SQL (or other suitable) database of server 11 (i.e., Pazit's database) with categorized tourism information after being processed by the data processing module 13.

The system is specifically adapted to allow a traveler 19 to use any communication device and method (e.g., a mobile phone or a computer equipped with a conventional web browser to log on to the Internet and access a website maintained on the web-enabled server 11). The Pazit's database is pre-populated with various tourism related geographical information classified by type of subject (e.g., lodging, attraction, sites, or a host of other services or leisure activities).

According to an embodiment of the invention, the traveler 19 can easily get in real-time solution organized into a "basket" form that is filled with information based on the data stored in the Pazit's database and that is filled by the informatour 17 (i.e., human factor which operates the human elements/materials, such as the TSG interface 18 through which the informatour 17 is able to communicate with Pazit). The system outputs the solution in form of maps, tables, images or other visual and/or textual form. The classification of the stored information is done among a huge source of subjects, categories, formulas, and any possible combinations, which Pazit needs to fit to plurality of different travelers (i.e., tourism anomaly), according to each specific needs for an upcoming trip, gather details, make selections, and accordingly Pazit compiles at least one possible itinerary. Using Pazit, the system of the present invention allows the traveler to obtain all of the travel-related planning in a personalized manner.

Figure 2:
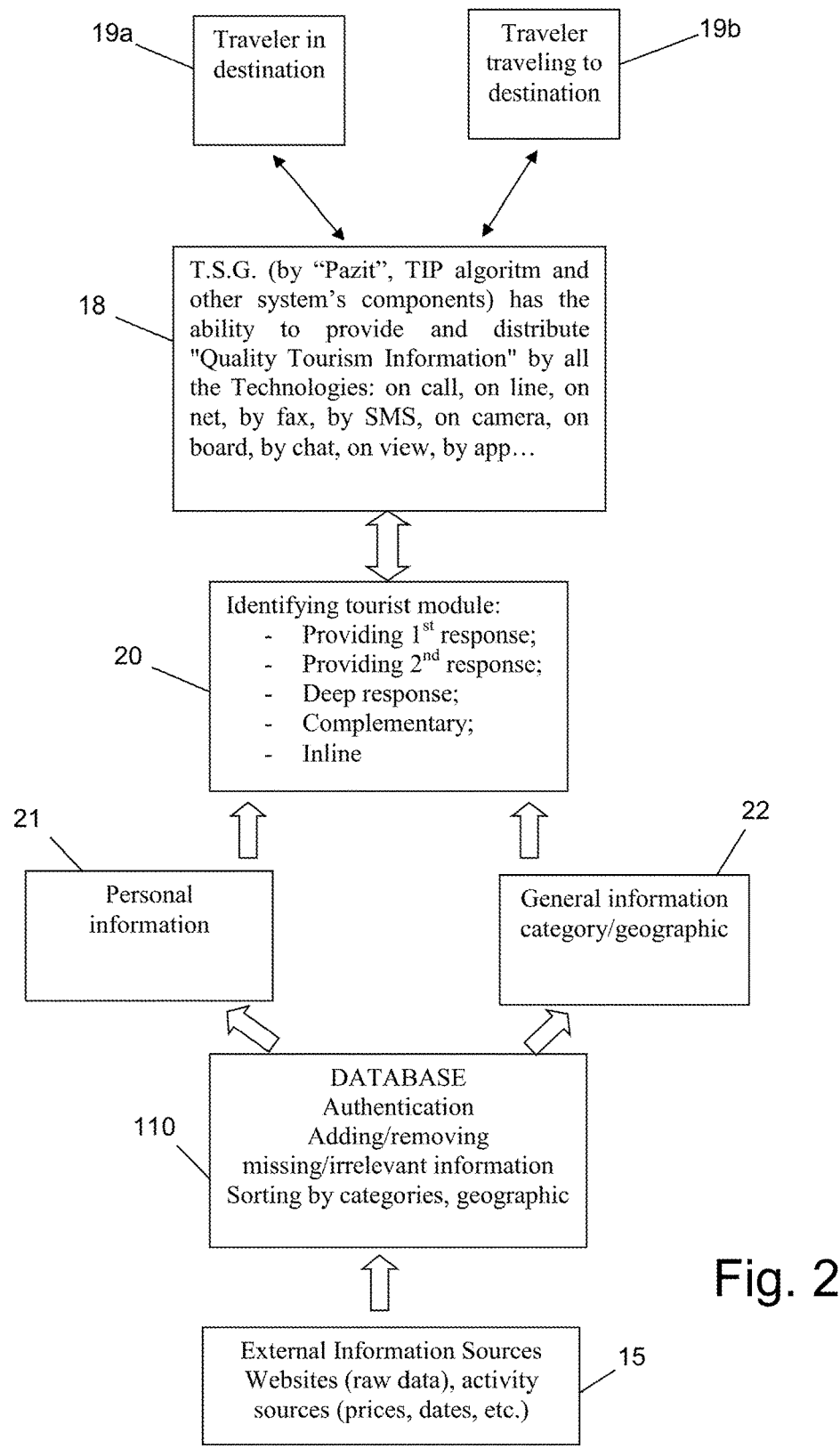
FIG. 2 is a flow chart illustrating the flow of information, according to an embodiment of the present invention.

The novel functionality of a travel planner platform (i.e., Pazit) disclosed herein is perhaps best discussed in relation to the FIGS. 1 and 2, each of which demonstrates a sample of what is achievable by the method of the present invention in the way of providing Quality Tourism Information (e.g., planning assistance and travel guide assistance). Many minor modifications and changes are obvious in view of its adaptability, and some of which are discussed herein as well. Also, although the method may preferably be tailored to work on a dedicated server unit having computing capabilities specially designed for such planning, it may nonetheless be adapted for use on a standard personal computer or other computing devices. The method may be implemented by software designed and programmed primarily in an object oriented programming language such as Java or C++.

Thereafter, the travel planner ongoing platform (i.e., Pazit) may also be accessed from a mobile device, and with the customized itineraries being transferred to the mobile device and usable thereon during travel at the destination, along with the specialized features designed to assist a traveler 19 during execution of the travel itinerary in real time.

FIG. 2 schematically illustrates the flow of information from the external information sources 15 to the traveler 19 in destination (as indicated by numeral 19a or while the traveler 19 travels to the destination (as indicated by numeral 19b). The external information sources 15 may include websites (raw data), activity sources (prices, dates, etc.), and the like.

Using Pazit, server 11 may applies tasks to the data stored in the database (the database is indicated by numeral 110 in FIG. 2). For example, the tasks may include:
performing data authentication;
adding/removing missing/irrelevant information;
sorting by categories;
sorting by geographic;
storing various features shown on the map that are represented by conventional signs or symbols. For example, colors can be used to indicate a classification of roads. These signs can be displayed in the margin of the map;
generating and managing lists and records of map signs, statistical history, traveler current needs, type of real-time solutions, responds to travelers queries, procedures, travel individual management of each specific traveler, list of traveler's typical set of question, etc.

The data stored in database 110 is divided into two main information solutions personal information 21 and general information 22 (based on category/geographic data). The divided information is used to provide a tourism solution via the TSG 18 (e.g., compile a tailored itinerary) in real time for the traveler 19 as a first response. Optionally, more response can be provided to traveler 19, if requested. The TSG 18 has the ability to provide and distribute "Quality Tourism Information" by all the Technologies: on call, on line, on net, by fax, by SMS, on camera, on board, by chat, on view, by app, etc.

According to an embodiment of the present invention, the TIP algorithm 12 applies to Pazit and it can be defined by the combination of the following parameters:
Providing "Quality Tourism Information" to the traveler 19 according to one or more queries ("X" queries) provided by him, in a response time ("T") of few seconds CS"), via one or more available technological communication means ("M") such as website, telephone call, sms, etc., in a reasonable prices ("P") that can be paid by any available ("K") payment arrangement or charging method ("R") such as Paypal, credit card and the like, in parameters of tourist ergonomics ("D"), as response to human material module ("B") for detection and authentication essence of the human need, in one or more configurations ("A") according to the spoken language ("G") or "icon language" (i.e., graphic symbols) that incorporates several response types using the call center 16 ("C6") that operates according to a technique that integrates the aforementioned parameters in a proper manner, thereby allowing the traveler 19 to fulfill the tourism experience in an optimal manner, and distribute the solution package for the traveler 19 by any kind of technology (e.g., e-mail, SMS, via a dedicated application installed on a smartphone, and the like).

The C6 technique refers to an implementation of a novel and unique call center 16 (Call Contact Content Context Connecting Center) that configured to operate as a combined one stop shop of different modules according to the requirements as defined by the TIP algorithm 12. The C6 technique adapted to implement anomaly detection with respect to quality tourist information. The system of the present invention via Pazit sorts, classifies, distributes the available information, the practical implementation in the face of possible, to the traveler 19.

The C6 connects between the different information sources available to Pazit such as the information stored in the database of server 11 that is pre-populated with various tourism related geographical information classified by type of subject according to the list of plurality of subjects defined by Pazit (e.g., lodging, attraction, sites, a host of other services, leisure activities and the like), weather conditions, contact information of and relevant information of service provider, and the presenting of all the relevant tourism related items on a map generated according to a geographical and localization based method. All this is done in real-time and according to the current demands and needs of the traveler 19 by Pazit. One skilled in the art will understand that these are exemplary list of subjects and the present invention should not be considered as limited to specific list.

According to an embodiment of the present invention, the system performs the tasks of retrieving an itinerary directly according to a traveler 19 (i.e., a FIT) query. Alternatively, a human operator (i.e., the informatour 17) is involved (at least partially), e.g., by entering queries to Pazit via the TSG interface 18 or by performing selection from different available and relevant displayed options via other User Interface (available to view from Pazit), in order to retrieve the itinerary.

All the above will be better understood through the following illustrative and non-limitative examples. The terms, "for example", "e.g.", "optionally", as used herein, are intended to be used to introduce non-limiting examples. While certain references are made to certain example system components or services, other components and services can be used as well and/or the example components can be combined into fewer components and/or divided into further components. The example appearance and terminology as depicted and described herein, are intended to be illustrative and exemplary, and in no way limit the scope of the invention as claimed.

For example, the system returns at least one suggested itinerary (generated by applying the TIP algorithm) that has been optimized according to the allotted time for the traveler to see as many of the most significant highlights as possible, in the given touring time, while taking into account the human factor based on the "Tourism Logic".

The itinerary may display photographs or other visual or audio objects of the recommended sites to be seen or heard in the suggested itinerary. One of the options in the system permits the tourist to consider other itineraries, and selecting that option may cause the display of a list of itineraries having alternate planning, optionally, along with a map (e.g., for reference by the traveler to be able to gauge the travel distances).

As an example, when a traveler that uses a dedicated application (via a smartphone) wants to receive an itinerary an initialize tour template can be selected as the first planning template to plan a single vacation itinerary. Selecting that template provides at least one possible related planning template, or sub-templates. In the first sub-template, "a) Key No. of Days: __ __ and Key Choice of City/region/area: __ __ __ __ __ __ __", the traveler may specify trip duration to be a specific length of time matching the traveler's available time in country such as 2 days, 3 days, . . . , 10 days, etc., and the choice of a city/region road or route that the traveler would like to explore. It can also provide "Ongoing-Tailor-Made" solutions en route and deal with any sudden request in real time.

An optional schedule may be one where the template selects the most desirable sites to be visited. The travelers may further change the scheduled itinerary in real-time and during the trip for touring of alternative sites (i.e., on-going-tailor-made solution).

The traveler can communicate with the system via any suitable communication method such as a browser, a dedicated client application adapted to communicate with the system, or a conventional phone call conversation. This access engenders a menu that contains introductory and the ability to input some tourist related information (e.g., on a specific localized area, schedule, etc.), advocating the use of the system to retrieve information by the TIP algorithm without having to search all over the web. Travelers may inquire for vacations, whether for extended travel, or even one day trips. They do not search for a vacation package that fits their interest as in conventional travel solutions such as existing travel sites or applications, but instead provide information/query that accordingly the system will create a personalized package, based on what they generally want and what exists and available in real time, in the area (in realty) or en route. For example, a traveler may ask the TSG system the following question: "i am in "X" and have 2 hours, what can I do here?" Accordingly, Pazit provides a personalized itinerary complete with relevant sightseeing, contact information (e.g., of important services nearby) and directions based on the operation of the TIP algorithm.

According to an embodiment of the invention, the system allows the traveler to specify what services-related travel highlights or resources they are interested in (related to the reality). For example, a visit along the Oxford Street (city center of Westminster, London, England) provides several attractions, such as shops, restaurants, hotels, galleries, fashions, music shops, etc.

In this example, the dedicated application comprises a screen menu, that is initially presented with form options of providing queries for conducting a search (e.g., for planning a vacation or a trip). Entering the query will direct the informatour to file a form that may be completed and submitted to Pazit. Clicking on the search takes the informatour into a form that may include optional fields such as city/region, schedule, budget, etc. For example, the select city/region invites the operator to select from a wide variety of locations resources listed categorically. In addition, the system may search for a full categorical index of complementary services related to the selected city, with sub-indices, including for example, transportations (e.g., airports, trains); amusement (equipment, parks, places); animal care (pet stores, pet supplies, veterinarians); appliances (dealers, rentals, repair); art gallery; automobile (car wash services, renting, repair and service); etc. It should be apparent that the categorical index with sub-indices of services is very thorough. One skilled in the art will understand that these are exemplary categories and the present invention should not be considered as limited to specific categories. The informatour may select one or more categories as available by Pazit.

Any one or a sub-combination of the interests for city and region may be selected by the informatour (or none at all). Once all desired interests are selected and submitted, the system compiles an itinerary by Pazit.

The system may provide the informatour a menu that, as above, includes alternate solution forms by which the informatour specifies what tourism-related travel highlights or resources the traveler is interested in. The traveler can only ask what is available in a specific area or location the tourist wish to travel or visit.

Pazit allow and make the ability to provide a solution including optional wishes, wants, needs, interests, conditions, limited or hobbies fields for tourism interests, city and region or route (along river, etc.).

The traveler only expresses his requests regarding a specific area by providing input in form of text, voice commands, and the like to the system that may include wishes, physical disabilities and other limitation (e.g., age of youngest traveler), etc. In return, the TSG system provides a tourist solution that is specific to that traveler, while taking into account any information available and related to this specific area and on the way to this area with respect to the traveler requests. For example, a traveler may provide a request such as the following:

"I want to travel to Zurich from Munich, but on the way I want to visit a water attraction sightseen and a zoo"

A full categorical index of tourism interests is allocated by Pazit, with sub-indices as necessary, including for example, All-Terrain Vehicle (ATV) Trails, Auctions, Biking, Bird Watching, Boating, etc. It should be apparent that the categorical index with sub-indices of tourism interests is obtained through Tourism Logic on geographical basis. One skilled in the art will understand that these are exemplary categories and the present invention should not be considered as limited to specific categories. It is important to mention that the full categorical index of tourism interests is huge All of the above-described solution forms associated with the tourism, lodging, restaurants or other services are used to compile an SQL database query when the search is submitted, an important advantage being that the Pazit is used for generating all of the respective solutions. As a result the Pazit generates at least one suggested itinerary. Selecting any suggested itinerary provides detailed display information for that selected itinerary.

It should now be apparent that using Pazit the system of the present invention aids a potential traveler in obtaining localized information specific to a particular geographic area by the novel and unique Tourism Individual Planning (TIP) algorithm that provides more value at a considerable savings of time and effort.

The following discussion is intended to provide a brief, general description of a suitable computing environment in which the system and its unique components may be implemented. While the invention will be described in the general context of program modules that execute in conjunction with an application program that runs on an operating system on a personal computer, or smartphone those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. With respect to the example processes described herein, not all the process states need to be reached, nor do the states have to be performed in the illustrated order. Further, certain process states that are illustrated as being serially performed can be performed in parallel.

All the above description and examples have been given for the purpose of illustration and are not intended to limit the invention in any way. Many different mechanisms, methods of analysis, electronic and logical elements can be employed, all without exceeding the scope of the invention.

What is claimed is:

1. A Tourism Solution Generator (TSG) system, comprising:
   a. a main operation module (Pazit) for providing quality tourism information (QTI) for a free individual traveler (FIT) to obtain localized information specific to a geographic area and to provide QTI and an ongoing itinerary tailored for said FIT in a few seconds;
   b. an independent web-enabled server adapted to communicate with a plurality of sources and databases that comprise information on a plurality of tourist attractions, lodging establishments, and services;
   c. a call center (C6) configured to operate as a combination of call, contact, content, context, and connecting center based on a tourism individual planning (TIP) algorithm while taking into account human factors based on "Tourism Logic", wherein said call center provides anomaly detection with respect to QTI; and
   d. a User Interface (UI) adapted to facilitate interaction with said independent web-enabled server via said call center by using a technological platform and to provide QTI based tourism solutions to said FIT, wherein said QTI defines the total type of information needed by said FIT, said UI comprising a menu containing introductory solutions for the geographic area and a function for allowing said FIT to provide one or more queries, wherein, as a result of the interaction, said independent web-enabled server retrieves solutions and generates in a few seconds in a first response at least one personal itinerary tailored for said FIT based on said TIP algorithm while taking into account the human factors in accordance with said "Tourism Logic" by combining and integrating content with the human factors including habits of said FIT, thereby enabling said FIT to obtain, in real time, the travel-related planning in an ongoing and personalized manner.

2. The system according to claim 1, wherein the interaction with the independent web-enabled server provides QTI that comprises localized and nationalized solutions specific to the geographic area and compiles an itinerary in real time.

3. The system according to claim 2, wherein the specific solution comprises a type of tourist attraction, lodging or service.

4. The system according to claim 2, wherein the interaction allows specifying a price range.

5. The system according to claim 1, further comprising an upcoming events module for providing a list of upcoming local events in said the geographic area via said C6 that is configured to operate according to the TIP algorithm.

6. A method for providing quality tourism information (QTI) for a free individual traveler (FIT), comprising the steps of:
   a. providing a main operation module (Pazit) configured to obtain localized information specific to a geographic area and to provide relevant QTI and an ongoing itinerary tailored for said FIT in a few seconds;
   b. maintaining an independent web-enabled server adapted to communicate with a plurality of sources and databases comprising information on a plurality of tourist attractions all within the geographic area;
   c. providing a call center (C6) configured to operate as a combination of call, contact, content, context, and connecting center based on a tourism individual planning (TIP) algorithm while taking into account human factors in accordance with Tourism Logic, wherein said C6 provides anomaly detection with respect to QTI;
   d. providing a User Interface (UI) to facilitate interaction with said independent web-enabled server via said C6, wherein said UI comprises a menu containing introductory solutions for on the geographic area to specify tourist attractions and resources according to one or more queries;
   e. submitting data that represent said one or more queries to said independent web-enabled server via said UI upon receiving said one or more queries from said FIT;
   f. processing said one or more queries by applying said TIP algorithm and by combining and integrating content with the human factors including habits of said FIT based on said "Tourism Logic", and retrieving information as solutions from said sources and databases; and
   g. generating an ongoing tailored itinerary according to said retrieved information in a few seconds as a first response, thereby enabling said FIT to obtain, in real time, the relevant travel-related planning in an ongoing and based on a personalized manner.

7. The system according to claim 1, wherein said database are populated with categorized tourism information after being processed by a data processing module of the independent web-enabled server.

8. The system according to claim 1, wherein said independent web-enabled server includes a data collection module for collecting QTI from external information sources.

* * * * *